United States Patent [19]

Humbert et al.

[11] Patent Number: 5,189,073
[45] Date of Patent: Feb. 23, 1993

[54] PROCESS FOR THE PRODUCTION OF EXPANDED MATERIALS BASED ON POLYUREA ELASTOMERS

[75] Inventors: Heiko Humbert, Hamburg; Werner Klockemann, Buchholz, both of Fed. Rep. of Germany; Dudley J. Primeaux, II, Elgin, Tex.

[73] Assignee: Texaco Chemical Co., White Plains, N.Y.

[21] Appl. No.: 855,357

[22] Filed: Mar. 19, 1992

[30] Foreign Application Priority Data

Mar. 19, 1991 [EP] European Pat. Off. ........ 91104262.0

[51] Int. Cl.$^5$ ................................................ C08G 18/14
[52] U.S. Cl. ............................. 521/110; 521/129; 521/133; 521/159; 521/163; 528/48; 528/53; 528/60; 528/61; 528/68
[58] Field of Search ............... 521/110, 129, 133, 159, 521/163; 528/48, 53, 60, 61, 68

[56] References Cited

U.S. PATENT DOCUMENTS

| | | | |
|---|---|---|---|
| 3,645,925 | 2/1972 | Speranza et al. | 521/130 |
| 4,026,840 | 5/1977 | Becham et al. | 260/2.5 |
| 4,049,931 | 9/1977 | Sander et al. | 252/438 |
| 4,080,345 | 3/1978 | Riemhofer | 544/180 |
| 4,122,038 | 10/1978 | Sandner et al. | 252/431 |
| 4,338,408 | 7/1982 | Zimmerman et al. | 521/115 |
| 4,645,830 | 2/1987 | Rasshofer et al. | 264/45.3 |
| 4,845,133 | 7/1989 | Priester et al. | 521/167 |
| 4,897,430 | 1/1990 | Speranza et al. | 521/163 |
| 4,980,388 | 12/1990 | Herrington et al. | 521/130 |
| 5,006,569 | 4/1991 | Stone | 521/118 |
| 5,068,306 | 11/1991 | Harris et al. | 528/68 |
| 5,153,232 | 10/1992 | Primeaux | 521/110 |

Primary Examiner—Maurice J. Welsh
Attorney, Agent, or Firm—Robert A. Kulason; James J. O'Loughlin; Christopher Nicastri

[57] ABSTRACT

A process for the production of expanded polyurea elastomers which comprises reacting:
a) an aliphatic polyetheramine having primary amino functions and essentially no free hydroxyl groups;
b) carbon dioxide in the form of carbamate, obtained by reacting carbon dioxide with a portion of the aliphatic polyetheramines;
c) a polyisocyanate;
d) water; and
e) a catalyst having a tertiary amino group;
in the presence of
f) an inert, halogen-free blowing agent.

21 Claims, 1 Drawing Sheet

PROCESS FOR THE PRODUCTION OF EXPANDED MATERIALS BASED ON POLYUREA ELASTOMERS

BACKGROUND OF INVENTION

1. Field of the Invention

The invention relates to a process for the production of expanded materials based on polyurea elastomers.

2. Description of the Related Information

Because of their versatility and adaptability to production conditions and consumer requirements, polyurethanes have become established worldwide as important and indispensable components of industrial polymers for the production of expanded products. The production of polyurethanes is based on matured working methods.

For a wide variety of reasons, polyurethane technology is now having to meet new requirements which demand permanent changes with regard to production and processing conditions. Reference may be made here, in particular, to the avoidance of fluorochlorohydrocarbon and other halogen based blowing agents. Although it is possible to change to substantially more expensive substitute products of the same type having less potential with regard to environmental pollution, the use of halogen-free blowing agents, carbon dioxide in particular, is preferable for ecological reasons and much more attractive simply for economic reasons. In spite of many experiments carried out in the past, the use of carbon dioxide as a substitute for fluorochlorohydrocarbons has not proved suitable owing to frothing, as described in a very recent publication (cf. M. Taverna, Conference Paper UTECH 1990, pages 70 to 73).

Changes are essential in polyurethane technology for reasons other than the above-mentioned problems with the blowing agents used to date. Thus, for example, the product quality must be substantially improved, in order to dramatically increase the life of the molded materials. For example, the requirements with regard to permanent improvement in the load-bearing capacity and in the overall ageing characteristics of foams are of primary importance here. Also for reasons relating to quality, it is necessary to reduce odor and fogging problems with the finished products, both for the processing industry and for the consumers. Here, it should be noted in particular that all starting materials not chemically fixed in the polymer matrix contribute to odor and fogging problems unless they have extremely high vapor pressures. This also affects aspects of occupational hygiene, toxicology and ecology. Unreacted isocyanates, phthalates as solvents for certain additives, partly volatile organometallic compounds and certain amine catalysts should be mentioned here as examples of the problem indicated.

Avoiding volatile constituents as far as possible during production and in the finished product serves not only to improve quality, but also improves occupational hygiene, toxicology and ecology. Public interest in this subject is rapidly resulting in higher standards with regard to foam technology.

Novel raw materials, with which several or all of the topical problems of foam technology can be solved are therefore being searched for worldwide. To the forefront of such considerations is, inter alia, the use of relatively high molecular weight polyols as starting materials for polyurethane foam technology.

In the recent technical literature, there is a recognizable trend towards a changeover to polyetheramines as reaction components in the preparation of polyurethane. In contrast to traditional polyols which have at least two free hydroxyl groups, the polyetheramines have radicals of primary or secondary aliphatic amines or primary aromatic amines instead of the free hydroxyl groups. R. D. Priester, R. D. Peffley and R. B. Turner, Proceedings of the SPI-32nd Technical Marketing Conference, San Francisco, 1989, described the use of amino polyols having secondary aliphatic or primary aromatic amino functions for the production of expanded polyureas having a low density. They state that these materials have substantial advantages over conventional polyurethane foams in several respects. They provide markedly increased load-bearing capacity, considerably improved ageing characteristics and, not least, an improvement in the flame characteristics.

Furthermore, EP-A 0 279 536 states that long-chain, aliphatic, oligofunctional secondary amines, together with polyisocyanates in the presence of customary catalysts and additives, can be processed to polyurea foams, although the latter are not further characterized.

This technique can fulfil several of the requirements mentioned at the outset and is therefore to be regarded as an advance. However, it did not make it possible to dispense with traditional additives, for example with tin catalysts and amine catalysts which contribute to odor and fogging problems. Moreover, another disadvantage which affects the technical usefulness of these procedures is evident to one skilled in the art. In fact, it has not been possible to date to prepare such polyetheramines by simple methods which meet economic and technical requirements. These disadvantages relate to raw material costs, yields and/or the chemical purity of the resulting products.

The preparation and use of product mixtures of polyetheramines predominantly containing secondary amino functions for the production of expanded polyureas have frequently been described in the literature. The derivatization of long-chain, aliphatic, oligofunctional, primary amines (U.S. Pat. No. 3,654,370), for example by alkoxylation, cyanoethylation, alcohol amination and reductive catalytic amination, has been proposed.

Another procedure envisages using short-chain, primary aliphatic amines with polyoxyalkylene compounds in a catalytic reaction, similar to the teaching of U.S. Pat. No. 3,654,370, for the preparation of long-chain, aliphatic, oligofunctional, secondary amines; cf. U.S. Pat. No. 4,904,705.

Various procedures have also been proposed for the preparation of aromatic polyetheramines, for example the reaction of commercial polyhydroxypolyethers with isatoic anhydride in one step or by multistage processes. In this context, for example, DE-A 2 948 419 describes the conversion of commercial polyhydroxypolyethers with aromatic diisocyanates into prepolymers, with subsequent hydrolysis of the remaining isocyanate groups, aminopolyols having terminal amino groups bonded to aromatic radicals being formed.

However, it is known in polymer chemistry that the product properties of polymers can be better controlled and influenced the purer the raw materials used. This also applies to the formation and the product properties of the polyurethane polymers discussed above. In the case considered, especially with regard to the reactive terminal groups, the avoidance of random distributions of differently substituted amines would therefore be particularly advantageous.

It is possible, although only at considerably increased cost, to prepare very pure, long-chain, aliphatic, oligofunctional, secondary amines (cf. DE-A 38 25 637). Such products are prepared by hydrogenating Schiff's bases, which are obtainable from ketones and oligofunctional primary polyoxypropyleneamines.

In fact, oligofunctional polyoxypropyleneamines having primary terminal amino groups, the use of which for the preparation of polyetheramines having secondary amino groups is described in DE-A 38 25 637, represent raw materials which are available on a large industrial scale and which are obtainable, for example, under the trade name JEFFAMINE ® (Texaco). The molecular weights of these substances are in the range between 230 and 8,000; their amine functionality is between 1 and 3.

The production of these products, for example according to U.S. Pat. No. 3,654,370, can be carried out in one step from petrochemical mass products, namely dioxypropylenepolyols and ammonia.

The direct use of such products for the production of expanded polyureas of low density would thus be much more economical and for technical reasons therefore desirable, because these substances are distinguished by a particularly high degree of amination and high uniformity with regard to their terminal groups. Another advantage of such products is that it is possible completely to dispense with structural elements such as esters, urethanes or ethoxy radicals for the synthesis of these polyol structures.

However, the literature shows that, although rigid and resilient, "expanded" polyureas having a high density and excellent properties can be produced using aliphatic polyetheramines with primary amino functions, the literature also shows that the extremely high reactivity of these polyetheramines prevent the production of expanded polyureas of low density.

In the production of "expanded" polyureas with high densities (800 to 1300 kg/m$^3$) with particular reference to the use of primary, oligofunctional, long-chain aliphatic amines, maximum reaction times of 2 to 3 seconds are observed, during which the liquid raw materials used solidify to give a solid material no longer capable of flow.

According to the teachings of EP-A 00 81 701 and of U.S. Pat. No. 4,269,945, blowing agents can be used in these processes. The object of this is to achieve an improvement in the product properties, namely in the surface quality of rigid and resilient moldings. By means of this measure, microcellular, "expanded" substances having high densities of more than 800 kg/m$^3$ are obtained. Only the use of permanent, dried gases, in particular nitrogen or air, has proved suitable in this procedure; this procedure is generally referred to as "nucleation". Although the use and/or concomitant use of autogenously produced carbon dioxide is proposed in these works, there is, however, absolutely no practical indication as to how the very rapid reaction, in which the reaction mixture solidifies to a mass incapable of flow, can be reasonably matched with the comparatively very much slower catalytic reaction of water with isocyanates. Furthermore, U.S. Pat. No. 4,910,231, in which, inter alia, a polyetheramine having primary amino groups can be reacted with an excess of polyisocyanate and water with formation of rigid foam, provides no ideas in this respect.

Accordingly, the process of the invention leads to the production of polyurea foams from polyetheramines having primary amino groups and polyisocyanates, in which, in spite of the high reaction rates to be expected in the case of such systems, foams having a low density and advantageous properties, inter alia, with respect to freedom from odor, resilience, mould release properties, content of unconverted diisocyanates and the like, can be obtained.

SUMMARY OF THE INVENTION

This object is achieved, according to the invention, by a process for the production of expanded materials based on polyurea elastomers, which is characterized by a reaction, with thorough mixing, of:
  a) an aliphatic polyetheramine having primary amino functions and essentially no free hydroxyl groups;
  b) carbon dioxide in the form of carbamate, obtained by reacting carbon dioxide with a portion of the aliphatic polyetheramines;
  c) a polyisocyanate;
  d) water; and
  e) a catalyst having a tertiary amino group;
in the presence of
  f) an inert, halogen-free blowing agent.

DETAILED DESCRIPTION OF THE INVENTION

Figure 1:
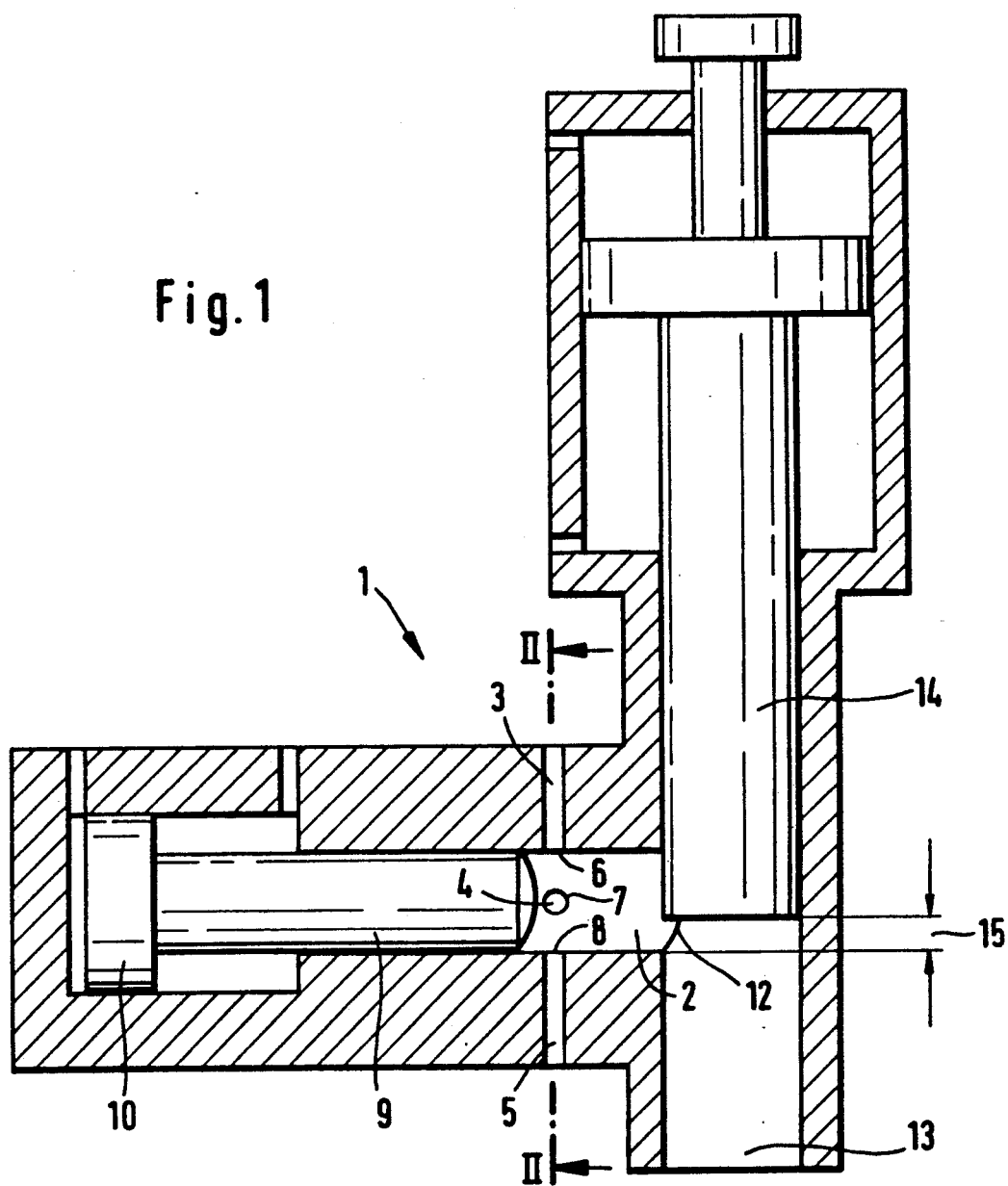
FIG. 1 is a schematic diagram of a section through the mixing head of an apparatus for mixing the components of an expanded polyurea elastomer.

All aliphatic polyetheramines which are known from the prior art and essentially have no free hydroxyl groups and whose amino functions are primary ones, including mixtures thereof, can be used for the process of the invention. Other polyetheramines which are likewise free of hydroxyl groups but contain secondary amino functions and as such are likewise known from the prior art discussed above can also be mixed with these polyetheramines, but in an amount of not more than 65% by weight, based on aliphatic polyetheramines having primary amino functions which are used. By adding these "secondary" polyetheramines, which are less reactive than the "primary" aliphatic polyetheramines, it is possible to influence the product properties to a certain extent via the reaction times.

Polyetheramines of the general formulas I and II are particularly preferred for the process of the invention:

$$R^2[[O(CH_2)_mCHR^1]_n(OCH_2CH_2CH_2)_oNH_2]_2 \quad (I)$$

where
  n denotes an integer between about 1 and about 100;
  o denotes 0 or 1;
  $R^1$ denotes hydrogen and m denotes the number 1 or 3, or
  $R^1$ denotes methyl and m denotes the number 1; and
  $R^2$ denotes one of the divalent radicals chosen from the group consisting of —CH$_2$CHR$^3$—, —(CH$_2$)$_4$—, and —CHR$^3$CH$_2$NHCONHCH$_2$CHR$^3$; where $R^3$ is hydrogen or methyl.

$$R^2[[O(CH_2)_mCHR^1]_n(OCH_2CH_2CH_2)_oNH_2]_3 \quad (II)$$

where n denotes an integer between about 1 and about 100;
o denotes 0 or 1;
$R^1$ denotes hydrogen and m denotes the number 1 or 3, or
$R^1$ denotes methyl and m denotes the number 1; and
$R^2$ denotes a trivalent radical chosen from the group consisting of: $CH_3—C(CH_2—)_3$, $CH_3—CH_2—C(CH_2—)_3$, and $(—CH_2)_2CH—$.

The preparation of the polyetheramines of general formulas I and II is described, inter alia, in U.S. Pat. No. 3,654,370, incorporated herein by reference. According to this, polypropylene glycol ethers are reacted with ammonia and hydrogen in the presence of suitable catalysts. The functionality of the resulting products can be influenced by using low molecular weight diols or triols as initiators for the polypropylene glycol ethers employed. Said diols or triols are usually, for example, ethylene glycol, propylene glycol, butanediol, glycerol, trimethylolpropane and the like, which are initially ethoxylated and/or propoxylated; (cf. also "The JEFFAMINE Polyoxyalkyleneamines", Company publication by Texaco Chem. Co., Houston, Tex., U.S.A. (1989)). It is of course also possible to use polyethylene glycols or polymeric 1,4-butanediols as initiators for the subsequent propoxylation in order to modify subsequent performance characteristics, for example crystallinity, flexibility and/or water absorption capacity and the like.

Polyetheramines having primary amino functions and suitable for the process of the invention are also obtainable according to DE-B 1 193 671 by cyanoethylation of polyhydroxypolyols with acrylonitrile and subsequent catalytic reduction. Other processes for the preparation of polyetheramines which have primary amino functions and can be used for the purposes of the invention are described in, inter alia, U.S. Pat. Nos. 3,155,728, 3,236,895 and FR-A 1 551 605.

Particularly preferred polyetheramines having primary amino groups are those which contain predominantly and/or exclusively propyleneoxy groups, that is to say, those which are derived from adducts of propylene oxide with compounds having reactive hydroxyl groups, since these building blocks result in advantageous properties in the products formed, for example, low water absorption, high flexibility and the like.

However, if the products formed are required to have high water absorption and increased crystallinity for reasons relating to application, it is preferable to use polyetheramines which have primary amino groups and contain ethyleneoxy or butyleneoxy building blocks in relatively large amounts, or exclusively, optionally as a mixture with the above-mentioned polyetheramines having propyleneoxy building blocks.

As already stated, it is also possible, together with the polyetheramines having primary amino functions, to be used according to the invention, to employ those having secondary amino functions; such polyetheramines to be used concomitantly are described in U.S. Pat. Nos. 3,666,798, 3,155,728 and DE-A 38 25 637. When these polyetheramines are concomitantly used, the following terminal groups and/or radicals are particularly preferred as substituents: 2-hydroxyethyl, 2-hydroxpropyl, propionitrile or, as alkyl radicals, n-butyl, sec-butyl, isobutyl, 1,3-dimethyl-1-pentyl and cyclohexyl.

Since, as already stated, compounds which contain propyleneoxy building blocks are preferred in the aliphatic polyetheramines having primary amino groups and to be used according to the invention, polyetheramines of the general formulas I and II in which $R^1$ is methyl and m is the number 1 and $R^2$, $R^3$, n, o and p are defined above are used in a preferred embodiment of the invention.

In another advantageous embodiment of the invention, polyetheramines having primary amino groups possess number average molecular weights in the range from 200 to 12,000.

The polyisocyanates to be used in the process of the invention may contain, as carrier groups, aromatic, aliphatic and/or mixed aliphatic/aromatic groups. Typical examples of polyisocyanates to be used for the purposes of the invention are straight-chain, aliphatic diisocyanates, such as 1,4-diisocyanatobutane, 1,5-diisocyanatopentane, 1,5-diisocyanatohexane and the like; cycloaliphatic diisocyanates, such as 1,4-diisocyanato-cyclohexane or isophorone diisocyanate or isomer mixtures thereof, and a large number of aromatic diisocyanates. The last-mentioned include isomer mixtures of 2,4- and/or 2,6-diisocyanatotoluene (TDI types), 2,2'-, 2,4'- and 4,4'-diisocyanatodiphenylmethane (MDI types), 2,4-diisocyanato-1-chlorobenzene, isomer mixtures of diisocyanatoxylenes and the like. A detailed list of commercial, suitable polyisocyanates is given in G. Oertel, Kunststoffhandbuch [Plastics Handbook], Volume VII (Polyurethanes), Carl-Hanser-Verlag, Munich and Vienna 1983. The above-mentioned TDI and MDI types, in particular in MDI types, optionally as a mixture with the TDI types, are preferred.

The MDI types include those which either contain small amounts of higher homologues from the synthesis of these substances or are commercially available as carbodiimide derivatives of pure MDI types.

The diisocyanates to be used according to the invention furthermore include prepolymers, in particular of MDIs, for example according to U.S. Pat. No. 4,732,919, incorporated herein by reference, which are obtainable from diisocyanates and primary long-chain aliphatic amines. It may be advantageous to produce these products in the process of the invention not separately but "on-line" during the injection process, in a means specially provided for this purpose.

Otherwise, the above-mentioned prepolymers may also be used as a mixture with the "monomeric" polyisocyanates.

It is advantageous to employ the polyetheramine and the polyisocyanate in amounts corresponding to a molar ratio of $NH_2$ to NCO groups in the range of 1:1.5 to 1:7. It is also advantageous to employ 1 to 4 moles of water per mole of NCO groups which are present in excess, based on $NH_2$ groups.

It is known to one skilled in the art that, in order to achieve optimum properties in expanded polyurethane plastics, so-called "hard segments" must be present in the polymer matrix for morphological reasons. It is also know that, for this purpose, aromatic polyisocyanates in particular are reacted with water using suitable catalysts. Carbamic acids which decompose into primary aromatic amines and carbon dioxide with decarboxylation are formed from the polyisocyanates and water in the course of this reaction. While the primary aromatic amines spontaneously react with further isocyanate to give polymeric urea, which forms the hard segments, the autogenously produced carbon dioxide is used as a blowing agent. Although it is possible to use this principle for producing the total amount of blowing agent, a fact also disclosed in the prior art, this has the disadvantage that an undesirably high proportion of hard segments results.

Since it is ideal for improving the product properties not to produce more hard segments, and hence also autogenously formed blowing agent, than is desired for the required properties, the residual blowing agent requirement is covered, according to the prior art, by readily vaporizing liquids which are added to the formation.

Fluorochlorohydrocarbons have been used to date for this purpose. As already mentioned, one of the advantages of the process of the invention is that carbon dioxide is used as the blowing agent, optionally in the presence of other inert gases, such as nitrogen or dry air. The gases are added to the polyetheramines under pressure, in exactly the desired amount. At least some of the added carbon dioxide reacts with the polyetheramines with formation of carbamates; consequently, the very high reactivity of the polyetheramines is reduced to a level suitable in practice. The $CO_2$ added to the polyetheramine enhances the flowability of the polyurea as it leaves the mixing head and before it gels. The polyetheramine "nucleated" in this manner is then fed to the reaction system. The feared effect where uncontrolled gas loss at the expense of foam yield occurs already during mixing and will not be observed during the expansion phase. It should be noted that so long as some $CO_2$ is added to the polyetheramine, the remainder of the blowing agent may be added to either the water or the polyisocyanate. It is, however, preferable to add all of the blowing agent to the polyetheramine.

In the process of the invention, too, formation of hard segments is effected by the catalytic decomposition of excess isocyanate with water. The catalysts used are those which accelerate the isocyanate/water reaction as selectively as possible. Furthermore, preferred catalysts from the class comprising the so-called "blowing catalysts" are those which have boiling points of at least 190° C. or can be chemically bonded by incorporation in the polymer matrix. These properties are on the one hand essential for carrying out the process of the invention but on the other hand also of great importance for avoiding or reducing odor and fogging properties of the expanded products.

Tertiary amines known per se from polyurethane chemistry can be used as catalysts in the process of the invention. An overview of types and modes of action is given in the above-mentioned "Kunststoffhandbuch" [Plastics Handbook], Volume VII (Polyurethanes), in particualr on pages 92 to 98.

In a preferred embodiment of the invention, the catalysts having tertiary amino groups are of the general formula III:

$$XCH_2CH_2MCH_2CH_2Y \qquad (III)$$

where
M denotes oxygen or a methylimino group;
X is chosen from the group consisting of N-morpholinyl, dimethylaminoethyl, dimethylamino and N-azanorbornyl groups; and
Y is chosen from the group consisting of N-morpholinyl, dimethylamino, dimethylaminoethyl, hydroxyl, N-methyl-N-(2-hydroxy-$C_1$–$C_2$-alkyl)-amino group, and N-azanorbornyl.

Particularly preferred catalysts are selected from the group consisting of 2,2-dimorpholinodiethyl ether, 2-(2-dimethylamino)-ethoxyethanol, bis-(2-dimethylaminoethyl)ether, 2-(2 dimethyl-aminoethyl)-2-methylaminoethanol and 2-(2-dimethylaminoethoxy)-ethylmethylaminoethanol. Typical examples of such catalysts are:
bis-(2-dimethylaminoethyl) ether; (available from Texaco Chemical Co. as TEXACAT ZF-20)
2,2-dimorpholinodiethyl ether; (available from Texaco Chemical Co. as TEXACAT DMDEE)
2,(2-(dimethylaminoethoxy)-ethylmethylamino)-ethanol; (available from Texaco Chemical Co. as TEXACAT ZF-10)
2-(2-dimethylaminoethoxy)-ethanol; (available from Texaco Chemical Co. as TEXACAT ZF-70)
N,N,N',N',N"-pentamethyldiethylenetriamine; (available from Texaco Chemical Co. as TEXACAT PMDETA)
bis-(azanorbornylethyl) ether, according to DE-A 37 07 911;
2-(2-hydroxyethoxy)-ethylazanorbornane, according to DE-A 37 07 911;
2-(2-dimethylaminoethyl)-2-methylaminoethanol; (available from Air Products as DABCOT)
N,N,N'-trimethyl-N'-(ethoxyethanol)-ethylenediamine, according to U.S. Pat. No. 4,582,938 incorporated herein by reference; and
2,5,11-trimethyl-2,5,11-triaza-8-oxadodecane, according to U.S. Pat. No. 4,582,983.

A further preferred catalyst having tertiary amino groups is 2,2,4-trimethyl-1-oxa-2-sila-4-azacyclohexane, available from Bayer, AG.

In another advantageous embodiment of the invention, the catalysts are used in amounts of from 0.01 to 5, in particular of 0.05 to 3 parts per hundred (phr), based on the weight of the polyetheramines. The catalysts are preferably dissolved in water and added as an aqueous solution to the reaction system. The amount of water is calculated so that it corresponds at least to the aliquot amount of polyisocyanate which is required for formation of the amount of hard segment and autogenously produced blowing agent required according to the formulation; however, the added amount of water may also be several times in excess of this amount.

Since products having particularly little odor can be prepared by the process of the invention, many of the catalysts customary in polyurethane chemistry, for example, 1,4-diazabicyclo[2.2.2]octane, dimethylethanolamine, dimethylcyclohexylamine, methylazanorbornane and the like, also prove to be undesirable owing to their considerable odor activity, even if these substances can in principle be used.

Another, not unimportant advantage of the process of the invention is that, with the exception of the already mentioned, indispensable, so-called "blowing catalysts", other catalysts are no longer requiried, including the organometallic catalysts otherwise usually employed in polyurethane chemistry. As already indicated further above, there are no disadvantages for the process of the invention if an excess of water over and above the calculated, formulation-related amount is used. Thus, it is possible effectively to reduce the content of free polyisocyanate in the end products to a minimum. In the process of the invention, it is possible to use customary polyurethane or polyurea additives, as described in the above-mentioned Kunststoffhandbuch [Plastics Handbook], Volume VII (Polyurethanes), in particular on pages 100 to 109. Typical examples are foam flame-proofing agents, anti-ageing agents, inert mineral, inorganic or organic fillers, internal lubricants and the like.

The process of the invention is advantageously carried out in a mixing head of the type described in the above-mentioned publication by M. Taverna, in particular on page 70; in the mixing head described there, only one further feed line for the water to be added need be provided. In a preferred embodiment of the invention, separate streams of the aliphatic polyetheramines, containing the catalysts, carbon dioxide bound as carbamate, optionally dissolved carbon dioxide and other inert, halogen-free blowing agents, and optionally polyurea additives to be added, and streams of the polyisocyanates, including the prepolymers thereof, and of water, are fed to the mixing head, and the mixture obtained is allowed to react to completion after leaving the mixing head; it is also possible to feed to the mixing head some or the total amount of the catalysts together with the polyetheramines. To reduce the viscosity and/or to adjust the reaction times, it may be advantageous to preheat the streams of reactants.

It is also preferable to carry out the reaction at super-atmospheric pressure.

The process of the invention makes it possible to produce expanded resilient polyurea materials having densities in the range of about 20 to 300 g/l.

The streams of components of the reaction can be processed by a one-shot system.

A mixing head particularly suitable for carrying out the process of the invention comprises a cylindrical mixing chamber, three component feed lines for components A, B and C, which lead into the mixing chamber, component A comprising the aliphatic polyetheramine, the catalyst having a tertiary amino group, the carbon dioxide in the form of carbamate, and the dissolved inert, halogen-free blowing agent, e.g., carbon dioxide, component B comprising the polyisocyanate and component C comprising water, a reversible piston in the mixing chamber for synchronous closing and opening of the component feed lines entering the mixing chamber and a constrictor arranged in the outlet orifice of the mixing chamber. The catalyst may be added to the water stream instead of or in addition to the polyetheramine stream.

The pressure in the component feed lines immediately before the entrance into the mixing chamber may be, for example, between 80 and 180 bar. This is particularly advantageous if the pressure in the component feed lines for components A and B immediately before the entrance into the mixing chamber is in the range from 140 to 160 bar and the pressure in the component feed line for component C immediately before the entrance into the mixing chamber is in the range from 80 to 110 bar.

The temperature of components A, B and optionally C immediately before the entrance to the mixing chamber may be, for example, in the range between 20° and 60° C. However, it may be expedient and, from the points of view of product quality, also advantageous to choose a temperature which is in the range from 90° to 120° C. for component C.

Metering of components A, B and C and dimensioning of the mixing chamber and of the constrictor are subject to the provision that the outlet velocity of the component mixture at the constrictor is in the range from 8 to 16 m/s.

In an apparatus for carrying out the process of the invention, the constrictor may be formed by a transverse slide arranged at the outlet orifice of the mixing chamber. Alternatively, the constrictor may be formed by a constriction produced in the sprue channel of a mold.

In the apparatus for carrying out the process of the invention, the mixing chamber is connected, preferably at right angles, to a stabilization chamber which has a larger cross-section than the mixing chamber and in which a further reversible piston is arranged, by means of which an adjustable constrictor can be produced in a position partially closing the outlet orifice of the mixing chamber.

The component feed lines can enter the mixing chamber at an angle of about 90° to one another.

The invention is described in detail below with reference to preferred embodiments.

The Examples were carried out in a mixing head of the arrangement described above and having three separate feed lines.

EXAMPLE 1

|  | Substance | Parts by weight | Density |
|---|---|---|---|
| Stream 1: | Jeffamine T 5000[1] | 80 | |
|  | Jeffamine D 2000[2] | 20 | |
|  | Tegostab B 4690[3] | 1 | |
|  | Texacat ZF 20[4] | 0.1 | |
|  | Carbon dioxide | 2.7[5] | |
|  |  | 103.8 | 1.034 |
| Stream 2: | Suprasec VM 25[6] | 54 | 1.175 |
| Stream 3: | Water | 4 | 1.000 |

[1] Product from Texaco Chemical Company, polyoxypropylenetriamine Amine equivalent: 0.52 meq/g.
[2] Product from Texaco Chemical Company, polyoxypropylenediamine Amine equivalent: 0.98 meq/g.
[3] Product from The. Goldschmidt AG, silicone.
[4] Product from Texaco Chemical Company, bis-(2-dimethylaminoethyl) ether.
[5] Gaseous carbon dioxide was introduced at a nitrogen pressure of 5 bar until the volumetrically calculated amount had been absorbed.
[6] Product from ICI, modified MDI (NCO content 24.3% by weight).

Stream 1, 2 and 3 were combined in a high-pressure mixing head and injected into a closed box mold to obtain a dense foam, according to the following two experiments.

| Components | Experiment 1 (Temperature, °C./pressure (bar)) | Experiment 2 (Temperature, °C./pressure (bar)) |
|---|---|---|
| Stream 1 | 40/150 | 43/150 |
| Stream 2 | 28/150 | 30/150 |
| Stream 3 | 20/90 | 50/90 |
| Oultet velocity at the constrictor of the mixing head: | 12 m/s | 12 m/s |
| Mold temperature, °C.: | 70 | 70 |
| Shot weight, g: | 500 | 450 |
| Mold volume, ml: | 7320 | 7320 |
| Rise time in mold, sec: | 40 | 36 |
| Tack-free time, sec: | 180 | 170 |
| Mold release time, sec: | 240 | 240 |
| Foam density (kg/m³) after compression and cooling.: | 65 | 57 |

The molar ratio of the $NH_2$ groups of the polyetheramines to the NCO groups was 1:5.12 in this Example, and that of the excess NCO groups to water was 1:177.

EXAMPLE 2

| Substance | Parts by weight | Density |
|---|---|---|
| Stream 1: Jeffamine T 5000[1] | 80 | |
| Jeffamine D 2000[2] | 20 | |
| Tegostab B 4690[3] | 1 | |
| Texacat ZF 20[4] | 0.1 | |
| Carbon dioxide | 2.7[5] | |
| | 103.8 | 1.034 |
| + Subsequent loading with carbon dioxide to density (42% nucleation) | | 0.601 |
| Stream: Suprasec VM 25[6] | 48 | 1.175 |
| Stream 3: Water | 4 | 1.000 |

[1] Product from Texaco Chemical Company, polyoxypropylenetriamine Amine equivalent: 0.52 meq/g.
[2] Product from Texaco Chemical Company, polyoxypropylenediamine Amine equivalent: 0.98 meq/g.
[3] Product from Th. Goldschmidt AG, silicone.
[4] Product from Texaco Chemical Company, bis-(2-dimethylaminoethyl) ether.
[5] Gaseous carbon dioxide was introduced at a nitrogen pressure of 5 bar until the volumetrically calculated amount had been absorbed.
[6] Product from ICI, modified MDI (NCO content 24.3% by weight).

Stream 1, 2 and 3 were combined in a high-pressure mixing head and injected into a closed box mold to obtain a dense foam.

Molar ratios:
$NH_2:NCO = 1:4.55$; and
NCO (excess): water 1:2.05.

| Components | Experiment 3 (Temperature, °C./pressure (bar)) |
|---|---|
| Stream 1 | 40/150 |
| Stream 2 | 28/150 |
| Stream 3 | 20/90 |
| Outlet velocity at the constrictor of the mixing head: | 12 m/s |
| Mold temperature, °C.: | 70 |
| Shot weight, g: | 350 |
| Mold volume, ml: | 7320 |
| Rinse time in mold, sec: | 40 |
| Tack-free time, sec: | 180 |
| Mold release time, sec: | 240 |
| Foam density, kg/m³ after compression and cooling.: | 44 |

The foams produced in Experiments 1, 2 and 3 could be readily compressed after removal from the mold, so that very fine-pore open-cell foam was formed.

The foams had particularly little intrinsic odor and proved to be completely cured after cooling, so that heating did not result in any significant improvement.

Figure 2:
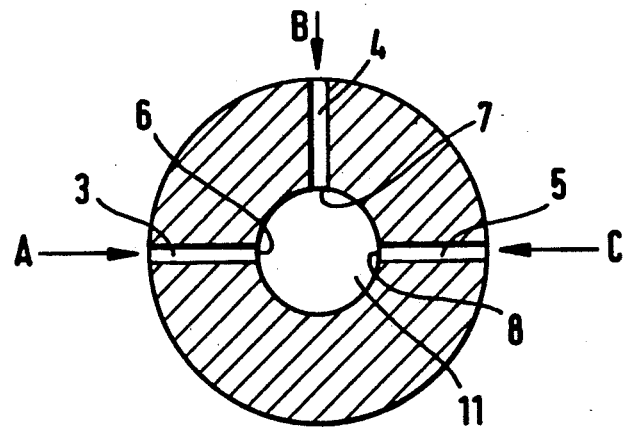
FIG. 2 is a section through the mixing chamber of the mixing head of FIG. 1, along the line II—II in FIG. 1.

The mixing head 1 shown in FIG. 1 contains a cylindrical mixing chamber 2 into which three component feed lines 3, 4 and 5 for feeding components A, B and C lead, displaced in each case at an angle of 90° (FIG. 2). The inlet orifices 6, 7 and 8 of component feed lines 3, 4 and 5 are opened and closed absolutely synchronously be a mixing chamber piston 9 which is reversible in the mixing chamber 2. The mixing chamber piston 9 can be operated by a hydraulic piston 10 and is located in the mixing position, in which the inlet orifices 6, 7 and 8 are open so that components A, B and C containing the reactants come into contact with one another under high pressure in the mixing chamber 2 and undergo thorough mixing there. In the non-mixing phase or in the blocking position (not shown), the mixing chamber piston 9 is in a position in which its end face 11 provides a flush seal for the outlet orifice 12 of the mixing chamber 2. The reactant mixture formed in the mixing chamber 2 is completely removed from the mixing chamber 2 by the mixing chamber piston, in the blocking position.

In the mixing phase shown in FIG. 1, the reactive mixture of the reactant components A, B and C enters, via the outlet orifice 12, the stabilization chamber 13 which is arranged downstream and at right angles with respect to mixing chamber 2 and in which a further reversible piston 14 is present. The piston 14 is in a constricting position in which it leaves the outlet orifice 12 partially uncovered, maintaining a gap 15.

We claim:

1. A process for the production of expanded polyurea elastomers comprising reacting:
   a) an aliphatic polyetheramine having primary amino functions and essentially no free hydroxyl groups;
   b) carbon dioxide in the form of carbamate, obtained by reacting carbon dioxide with a portion of the aliphatic polyetheramines;
   c) a polyisocyanate;
   d) water; and
   e) a catalyst having a tertiary amino group;
in the presence of
   f) an inert, halogen-free blowing agent.

2. The process according to claim 1 wherein the aliphatic polyetheramine comprises compounds of general formula

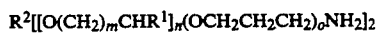

$R^2[[O(CH_2)_mCHR^1]_n(OCH_2CH_2CH_2)_oNH_2]_2$ where
n denotes an integer between about 1 and about 100;
o denotes 0 or 1;
$R^1$ denotes hydrogen and m denotes the number 1 or 3, or
$R^1$ denotes methyl and m denotes the number 1; and
$R^2$ denotes one of the divalent radicals chosen from the group consisting of $-CH_2CHR^3-$, $-(CH_2)_4-$, and $-CHR^3CH_2NHCONHCH_2CHR^3$;
where $R^3$ is hydrogen or methyl.

3. The process according to claim 1 wherein the aliphatic polyetheramine comprises compounds of general formula:

$R^2[[O(CH_2)_mCHR^1]_n(OCH_2CH_2CH_2)_oNH_2]_3$ where
n denotes an integer between about 1 and about 100;
o denotes 0 or 1;
$R^1$ denotes hydrogen and m denotes the number 1 or 3, or
$R^1$ denotes methyl and m denotes the number 1; and
$R^2$ denotes a trivalent radical chosen from the group consisting of: $CH_3-C(CH_2-)_3$, $CH_3-CH_2-C(CH_2-)_3$, and $(-CH_2)_2CH-$.

4. The process according to claim 2 wherein $R^1$ is methyl and m is 1.

5. The process according to claim 3 wherein $R^1$ is methyl and m is 1.

6. The process according to claim 2 wherein the polyetheramines have an Mn of about 200 to about 12,000.

7. The process according to claim 3 wherein the polyetheramines have an Mn of about 200 to about 12,000.

8. The process according to claim 1 wherein the polyisocyanate comprises diphenylmethane diisocyanate.

9. The process according to claim 1 wherein the polyisocyanate comprises diphenylmethane diisocyanate and toluylidene diisocyanate.

10. The process according to claim 1 wherein the polyisocyanate includes prepolymers thereof.

11. The process according to claim 1 wherein the polyetheramine and the polyisocyanate are used in relative amounts corresponding to a molar ratio of $NH_2$ to NCO groups in the range of 1:1.5 to 1:7.

12. The process according to claim 1 wherein 1 to 4 moles of water are employed per mole of NCO groups which are present in excess, based on $NH_2$ groups.

13. The process according to claim 1 wherein the catalyst having a tertiary amino group comprises a compound of general formula:

$$XCH_2CH_2MCH_2CH_2Y$$

where
M denotes oxygen or a methylimino group;
X is chosen from the group consisting of N-morpholinyl, N-azanorbornyl, dimethylamino and dimethylaminoethyl groups; and
Y is chosen from the group consisting of N-morpholinyl, N-azanorbornyl, dimethylamino, dimethylaminoethyl, hydroxyl and N-methyl-N-(2-hydroxy-$C_1$–$C_2$-alkyl)-amino group.

14. The process according to claim 1 wherein the catalyst having a tertiary amino group is chosen from the group consisting of 2,2-dimorpholinodiethyl ether, 2-(2-dimethylamino)-ethoxyethanol, bis-(2-dimethylaminoethyl) ether, 2-(2 dimethyl-aminoethyl)-2-methylaminoethanol and 2-(2-dimethylaminoethoxy)-ethylmethylaminoethanol.

15. The process according to claim 1 wherein the catalyst having a tertiary amino group is 2,2,4-trimethyl-1-oxa-2-sila-4-azacyclohexane.

16. The process according to claim 1 wherein the catalyst having a tertiary amino group is employed in amounts ranging from about 0.01 to about 5 phr based on the polyetheramines.

17. The process according to claim 1 wherein the catalyst having a tertiary amino group is employed in amounts ranging from about 0.05 to about 3 phr based on the polyetheramines.

18. The process according to claim 1 wherein the inert, halogen-free blowing agent is a material selected from the group consisting of carbon dioxide, nitrogen and dry air.

19. The process according to claim 1 wherein separate streams comprising
a) the aliphatic polyetheramine, the catalyst having a tertiary amino group, the carbon dioxide in the form of carbamate, and the dissolved inert, halogen-free blowing agent.;
b) the polyisocyanate; and
c) water
are fed to a mixing head, and the mixture obtained is allowed to react to completion after leaving the mixing head.

20. The process according to claim 19 wherein the stream comprising the aliphatic polyetheramine, the catalyst having a tertiary amino group, the carbon dioxide bound as carbamate and the dissolved inert, halogen-free blowing agent further comprises a polyurea additive.

21. The process according to claim 1 wherein the reaction is carried out at superatmospheric pressure.

* * * * *